Figure 2:
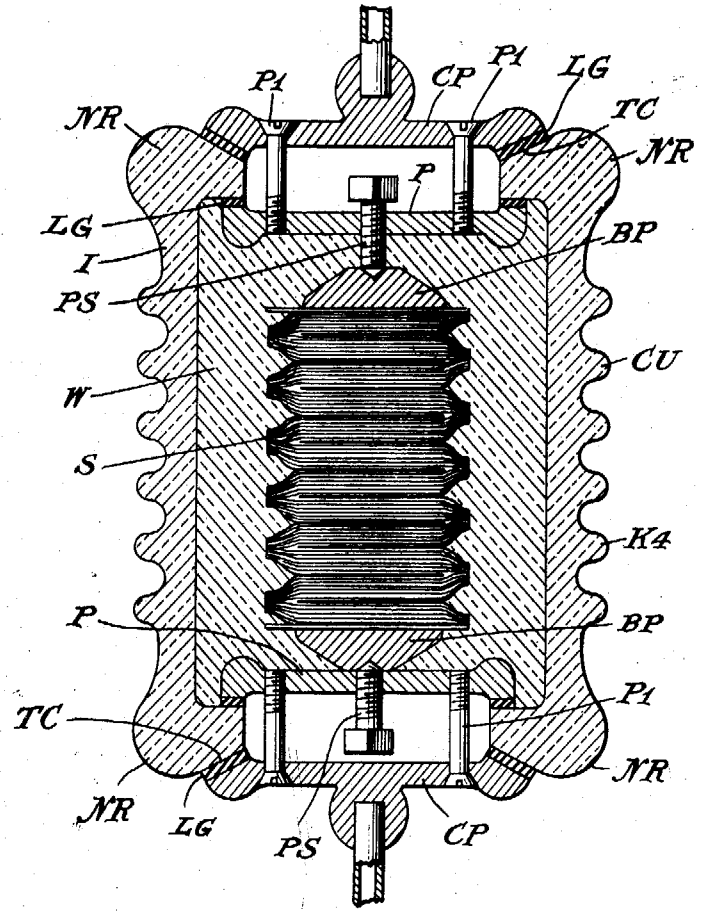

J. A. PROCTOR ET AL

Dec. 30, 1930.

ELECTRIC CONDENSER
Original Filed Jan. 23, 1925

Re. 17,916

INVENTORS
John A. Proctor
William M. Bailey
BY
Philip Farnsworth
ATTORNEY

Reissued Dec. 30, 1930

Re. 17,916

UNITED STATES PATENT OFFICE

JOHN A. PROCTOR, OF LEXINGTON, AND WILLIAM M. BAILEY, OF LYNN, MASSACHUSETTS, ASSIGNORS TO WIRELESS SPECIALTY APPARATUS COMPANY, OF BOSTON, MASSACHUSETTS, A CORPORATION OF NEW YORK

ELECTRIC CONDENSER

Original application filed January 23, 1925, Serial No. 4,150. Divided and application filed September 18, 1925, Serial No. 57,073. Original No. 1,697,477, dated January 1, 1929. Application for reissue filed May 16, 1929. Serial No. 363,564.

This application is a division of our application Serial Number 4,150 filed January 23, 1925.

This invention relates to improvement in electrical condensers, particularly in high potential condensers, and more particularly of the sheet-stack type, especially wherein the stack for high potential service comprises a plurality of sections insulated from one another by insulating sheets between the sections in the stack and connected in series with one another by connections outside the stack.

Among the various objects of the invention is that of providing a structure which is an improvement on the special type wherein the stack is contained in a substantially more or less tubular casing which consists of insulating material preferably such as porcelain and which is provided with metal ends which serve to clamp the stack under high compression inside the casing, to complete the enclosure of the stack and to serve as electrical terminals at high potential differences which lie at opposite ends of the structure separated from one another by the insulating walls of such casing. As shown in the drawings, the tubular casing at at least one and preferably both ends has an integral inwardly projecting shoulder for cooperation with the adjacent metal end.

Figure 1:
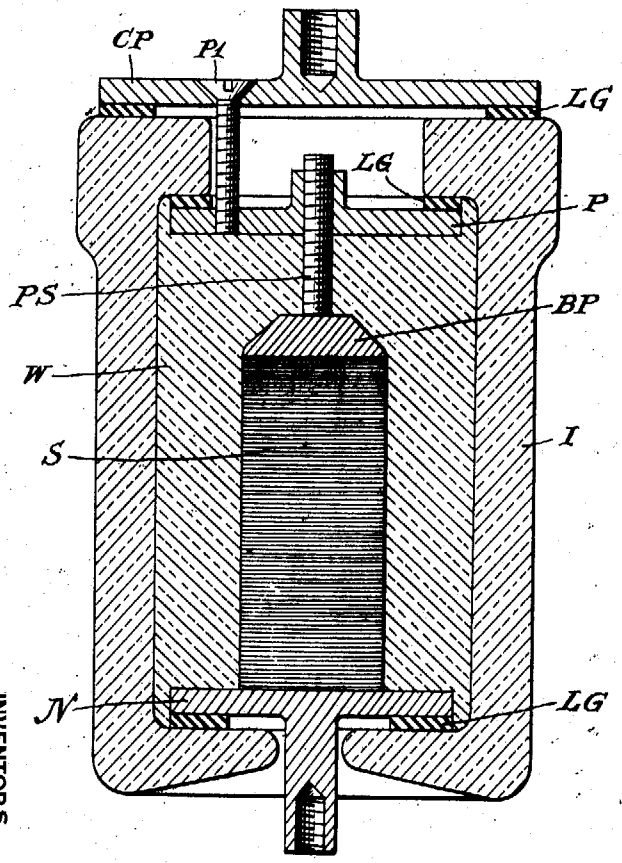

The invention consists of the various features of construction substantially as described hereinafter and as shown in the drawings, of which Figure 1 is a central vertical section of a complete condenser unit, and Fig. 2 is a similar view of a modification.

In this condenser the stack S preferably consists of series-connected sections, which are insulated from one another by mica sheets projecting outside of the stack of metal foils, as usual, each section consisting of alternating mica sheets and foil sheets. This construction results in a high potential difference across the end sections of stack S when, as usual, the foils of opposite polarity which project from opposite ends of each section are soldered or fused to the like foils of adjacent sections.

In this invention, the casing for stack S consists of a tube I of porcelain, such material being that heretofore extensively employed in high potential insulators, but here serving as a casing for stack S. The open ends of this porcelain casing are closed by metal end structures.

The bottom end member N (Fig. 1) is preferably of malleable iron, and is one of the compression members of the clamping system for stack S, which rests upon it, the member N constituting a terminal of the condenser. In assembling, the foils of the bottom section of stack S are electrically connected to terminal member N, in any desired manner. End N closes and seals the lower end of casing I.

On top of stack S is placed a metal bearing plate BP. Stacks S may be embedded in paraffin wax or submerged in oil; but owing to the insulation provided by the insulating material comprising casing I, between the metal ends of the stack, the only function of the wax or oil, if used, is to prevent flashover from stack-section to stack-section. Stack S may lie as close as desired to the interior wall of casing I, so that a compact over-all structure is permitted. The exterior wall of casing I preferably is glazed. The inside wall of casing I is unglazed to permit intimate contact by wax or oil W, to seal against moisture and prevent leakage path between terminals.

The bottom opening in casing I preferably is small, but large enough to permit exit of one circuit terminal or lead. The top central opening of casing I preferably is larger. The porcelain wall at the top of casing I and at the upper portion of the sides thereof is of even greater thickness than the thick side walls, in order to provide greater strength at such points where the clamping strains are transmitted to the porcelain casing as a whole as the tension member of the stack-clamping system. Metal bottom plate N is the lower compression member of the clamping system and is located inside casing I, being inserted therein thru the larger top opening. Member N preferably rests on a lead gasket LG, which protects the porcelain or pyrex glass of the casing equalizing the downward pressure on it by plate N and flowing under any irregularities in the bearing shoulder of the casing, thereby providing an even bearing surface for the member N. The circuit terminal or lead projecting through the small bottom opening of casing I may consist of an integral extension from plate N.

The metal top construction is as follows: The bearing plate BP on top of stack S is forced down on the stack by screw PS. The upper end of screw PS engages in a metal pressure plate P, which thereby, when the screw is adjusted to compress the stack, is forced upwardly against a lead gasket LG, which separates plate P from the inner wall of the top of insulating casing I. A cover plate CP is secured to the assembly by screws $P^1$, which extend down into plate P, a lead gasket LG preferably being located between plate CP and insulating casing I. Plate CP seals the interior of the condenser from access of moisture from outside, and performs no clamping function. Here, the insulating casing I constitutes the tension member of the stack-clamping system. Plate CP, as shown, may be provided with an upward extension to serve as the second circuit terminal, and this may be threaded as shown, as in the case of the extension from lower plate N.

The ends of casing I and of the metal end members should be parallel with one another. The casing I, of the form shown in Fig. 1, may be provided with the corrugations, skirts or petticoats $K^4$ shown in Fig. 2, to increase the leakage distance of high potential flashover from one metal end to another over the glazed porcelain exterior of casing I. The glaze seals the porcelain pores and assists in shedding water and dirt. The corrugations, in addition to increasing the flashover distance, also assist in shedding water and dirt and provide surfaces beneath them which are protected more or less from access of moisture and dirt; and they serve to increase the mechanical strength of the porcelain casing, in this sense constituting a thick casing wall with or without excessive thickness of the rest of the casing wall. The condenser hereof is a weatherproof and waterproof high potential condenser which is designed for outdoor service in connection with adjacent high tension lines.

Between the top of stack S and the upper end casing I is a space which provides tolerance for stacks of varying length and substantially the same capacitance; pressure screw PS being sufficiently long for this purpose.

Pressure plate P is applied before the application of the sealing or cover-plate CP. Plate P (with screw PS) clamps stack S under high compression of the order of a thousand pounds more or less per square inch of active area of the stack. Plate P preferably is of steel. When it is applied, together with screw PS, the lower end of the latter bears down on member BP, and further adjustment of screw PS pushes plate P upwardly against the inner top wall of casing I, so that the latter becomes the tension member of the stack-clamping system.

The condenser unit is now complete save for the sealing or cover-plate CP, of steel, for water and weather protection of the interior of the condenser. This plate CP performs no compressing function. It is secured in place by an annular series of screws $P^1$, which enter plate P. Screws $P^1$ provide the electrical connection between plates P and CP. Thus cover-plate CP and bottom end N are the opposite potential terminals of the condenser at high potential difference.

Casing I, while preferably of porcelain, may be in some cases of other insulating material such as, preferably, pyrex glass, and even micarta, bakelite, etc. Porcelain or pyrex glass, however, are preferred for the weatherproof form, being better for this type of condenser generally on account of their strength which is availed of in special ways by this invention, the structural weakness of the porcelain or glass in other respects being sufficiently discounted by adequate thickness of the casing walls as shown in proportion. In practice, this condenser unit has dimensions which over-all and in detail are larger by several times than the dimensions of the drawings.

This structure provides a strong clamping-casing not withstanding the fact that it consists largely of insulating material, no kind of insulating material having structural strength compared to metal. In this structure there are no metal parts which lie between the two opposite potential ends and terminals, save only the stack-armatures, i. e., the metal foils. Also, there is ample leakage or flashover path over an ideal insulator between the metal ends. By virtue of the special construction disclosed herein, the fair degree of structural strength of the porcelain or pyrex glass is utilized and its weakness as a material is minimized. The metal ends perform four functions, (1) compress the stack; (2) serve as condenser terminals; (3) serve as localizers of electrostatic fields at opposite potential ends of the stack; and (4) may serve as means by which successive condenser units, arranged end to end, may be mounted together. On account of the insulation provided by casing I, the problem is entirely eliminated which has been involved in series sectional high potential condensers in connection with the insulation of a high potential terminal from a metal stack-casing out thru which such terminal extends from the stack.

The condenser units hereof are designed for low current service (at high potential) and, therefore, no special means is shown to provide for heat dissipation, other than the metal end structures and the insulating filler, such as wax or oil W, when used. In other and higher current uses of the invention, however, such special heat-dissipating means may be incorporated as desired by the designer.

The condenser units hereof are designed particularly for outdoor use in arrangements of plural units, as high potential, low-current condensers for coupling carrier-wave transmitting apparatus to a high potential transmission line. The line may carry power currents of the order of tens of kilovolts. The potential across each of a plurality of combined condenser units hereof may be over twenty thousand volts. The function of the condensers is to provide a good path for the radio frequency carrier currents but at the same time a poor path for the higher voltage line current.

In the modification of Fig. 2, the insulating casing I, preferably of porcelain or pyrex glass, is similar to that of Fig. 1, save that its exterior is provided with the corrugations $K^4$ and save that all four corners NR are thickened for extra strength at such points, where the clamping strains are transmitted to the casing acting as the tension member of the stack-clamping system. The metal end structures are duplicated at the two ends of casing I, as follows. Two metal plates BP are located at the ends of stack S, as bearing plates, each with an adjusting screw PS which passes thru a pressure plate P. Casing I at top and bottom has a tapered portion TC. Metal end members CP have correspondingly tapered surfaces, the cooperating tapers of metal and insulating parts being separated by lead gasket LG. Metal sealing covers CP are secured by screws $P^1$ to pressure plates P, the latter being separated by lead gaskets LG from the inner wall of insulating casing I. When screws PS are moved toward bearing plates BP, the pressure plates P are moved in the opposite direction more tightly against the end of casing I, thereby putting stack S under compression and making casing I the tension member of the clamping system. Since plates CP here perform no clamping function, as in Fig. 1, they are applied to the assembly after final adjustment of screws PS, as in Fig. 1.

In the claims the specification of the casing as consisting of porcelain is intended to include all patentable novelty as to such specific material itself, in addition to other materials of functional equivalency, including pyrex glass, in the several combinations of the claims.

As used in the appended claims the term end members includes either or both members CP and/or P or LG.

We particularly point out and distinctly claim the part, improvement or combination which we claim as our invention or discovery, as follows:—

1. The combination with an electrical condenser stack to be enclosed and compressed, of a porcelain casing surrounding the stack, a clamping terminal located inside the said casing at one end of the stack; and a device located inside the casing at the other end of the stack and forcing the stack against said clamping terminal and thereby against the casing as a tension member of means clamping the stack.

2. The combination with an electrical condenser stack, and a porcelain casing surrounding said stack, of a clamping terminal located inside the casing and between an end of the stack and an end of the casing; another clamping terminal located at the other end of the stack and casing; and clamping means forcing the stack ends together and said terminals apart and putting the stack under compression and the porcelain casing under tension.

3. The combination with an electrical condenser stack, of a porcelain casing surrounding it, and metal clamping members located inside the casing and compressing the stack between them therein and arranged to put the porcelain casing under tension as a tension element of the complete clamping means for the stack.

4. The combination with an electrical condenser stack, of a porcelain casing therefor having end openings; a metal clamping terminal closing one end of the casing and receiving a compression thrust from one end of the stack; a metal structure at the other end of the casing transmitting compression strains on the stack to the casing as a tension member; and a metal cover secured to said last specified metal structure and closing the adjacent opening in the casing.

5. The combination with an electrical condenser stack, of a porcelain casing therefor having open ends; a metal clamping terminal closing one end of the casing and receiving a compressing thrust from an end of the stack; a metal structure at the other end of the casing and transmitting stack compression strains to the casing as a tension member; and a metal cover closing said other end of the casing.

6. The combination with an electrical condenser stack, of a porcelain casing therefor having opposite end openings; a metal clamping terminal closing one end of the casing; a metal cover closing the other end of the casing; and a metal member secured to said cover and transmitting stack compression strains to the casing as a tension member.

7. The combination with an electrical condenser stack, of a generally tubular porcelain casing therefor having at an end an integral inwardly projecting shoulder; a metal plate inside said casing and engaging the inner wall of said shoulder; and a stack clamping device inside the casing and between the stack and said plate and forcing them apart, thereby transmitting stack-clamping strains by way of said plate to the casing as a tension member.

8. The combination with an electrical condenser stack, of a generally tubular insulating casing therefor having at its ends integral inwardly projecting shoulders; a metal member inside the casing at one end thereof and receiving compression strains from the adjacent end of the stack and thereby forced against the interior of one end shoulder of the casing; and a metallic structure at the other end of the stack and casing, through which compression strains on the stack and against the other shoulder of the casing are exerted.

9. The combination with an electrical condenser stack, of a generally tubular insulating casing therefor having at its ends integral inwardly projecting shoulders; a metal member inside the casing at one end thereof and receiving compression strains from the adjacent end of the stack and thereby forced against the interior of one end shoulder of the casing; and a metallic structure also inside the casing and at the opposite end of the casing and stack, exerting compression strains on the stack and, cooperatively with said metal member, exerting tension strains on the interior of the other end shoulder of the insulating casing.

10. The combination with a series sectional condenser stack to be enclosed and highly compressed, of a casing of structural insulating material enclosing such stack and formed at one end with an integral inwardly projecting shoulder defining a small opening; a metal plate lying between an end of the stack and the interior wall of said shoulder and receiving a compression thrust on the other end of the stack, said plate being too large to be insertible thru said small opening, and a terminal-lead extending from said plate out thru said opening; said casing having an opening opposite said lead-opening and of sufficient size for insertion of said plate; and a metal stack-clamping structure at the end of the casing having the larger opening, and arranged to transmit the compression strains of the clamp to the insulating casing.

11. The combination with a series-sectional condenser-stack to be enclosed and highly compressed, of a casing enclosing such stack and formed with an integral inwardly-projecting shoulder defining a small opening; a stack-and-clamping member lying between an end of the stack and the interior wall of said shoulder and closing said small opening; said clamping-member being too large to be insertible thru said small opening; and a terminal lead extending from out thru said small opening; said casing having an opening opposite said lead-opening and of sufficient size for insertion of said clamping member and the stack for assembly with the casing; and a second stack-end-clamping member extending across said larger opening and taking the clamping stresses at the other end of the stack.

12. The combination with a series-sectional condenser-stack to be enclosed and highly compressed, of a casing of structural insulating material enclosing such stack and formed with two openings opposite one another and opposite the ends of the stack, said insulating casing having integral inwardly projecting walls defining said respective openings; and metal stack-clamping devices located between the inner faces of said inwardly projecting integral walls respectively and the respective ends of the stack.

13. In combination, a series-sectional high potential stack of condenser sheets subject to intimacy of surface contact by mechanical compression, a porcelain casing therefor; and metal end members constituting elements of a clamping system for the stack and secured to said casing the latter constituting the tension clamping members of the system, and said casing having a substantially thick wall with tapered portions at points of engagement with said metal end members.

14. In combination, a series-sectional high potential condenser sheet-stack, a porcelain casing therefor, and metal end members constituting elements of a clamping system for the stack, said end members being secured to said porcelain casing; and said casing, as the tension member of the stack-clamping system, having a substantially thick wall enabling it to withstand the clamping strains.

15. In combination, a series-sectional high potential condenser sheet-stack, a porcelain casing therefor, and metal end members constituting elements of a clamping system for the stack, and secured to said casing, constituting it the tension member of the stack-clamping system, the wall of said casing being tapered at the points of engagement with said metal end members thereby strengthening it at the points of greatest clamping strain.

16. In a high potential condenser, the combination with a condenser stack to be enclosed and compressed, and comprising a plurality of serially connected sections; of a thick-walled porcelain stack-casing; a metal stack-compressing member exerting clamping compression against an end of the stack; and a metal strain-transmitting member mechanically connected to said compressing member and forced thereby away from said stack-end into compressing engagement with said casing, putting the latter under tension strain; and protecting means between said porcelain casing and said metal strain-transmitting member at the place of their mutual compressing engagement.

17. In a high potential condenser, the combination with a condenser stack to be enclosed and compressed, of a porcelain casing therefor; a clamping screw exerting compression strain on one end of the stack; a pressure plate acting between the clamping screw and casing and transmitting clamping strains to the casing as a tension member; and a cover plate closing the end of the casing.

18. In combination, a series-sectional condenser sheet-stack having high potential difference across its ends, a tubular porcelain casing surrounding the sides of said stack and having openings at its ends adjacent the stack-ends; the exterior surface of said casing being glazed and its interior surface being spaced from the sides of the stack and unglazed; and embedment of insulating material which is liquid at moderate temperatures and fills the space between the sides of the stack and the casing and forms a seal with the unglazed interior wall of the casing; and metal end structures secured to said casing, closing the open ends thereof, and enclosing the embedded stack.

19. The combination with an electrical condenser stack, of a porcelain casing therefor having end openings; metal end structures at the ends of said casing; means compressing the stack and forcing the metal end structures away from one another, putting the casing under tension; and a joint material intervening between the metal end structures and the portions of the casing engaged thereby and directly taking the strains of the clamping system between the metal end structures and the casing.

20. The combination with a series-sectional condenser sheet-stack, of metal end structures constituting circuit terminals of said stack; a porcelain casing for said stack open at its opposite ends, glazed on its exterior surface and having its interior surface unglazed and spaced from the stack; said metal end structures closing the ends of the casing, and the glazed exterior surface of the casing between said end structures constituting a long leakage path between the metal end terminals; and an insulant which is liquid at moderate temperatures and fills the space between the stack and the interior wall of the casing; said insulant reducing liability of flashover from section to section of the stack, and engaging the unglazed inner casing wall to form a seal, reducing liability to leakage along said wall between the end terminals.

21. In combination, a condenser comprising a plurality of unit sheet-stacks themselves arranged end to end in a main stack and each unit stack comprising condenser sheets, the unit stacks having their faces insulated from one another in the main stack but electrically connected in series whereby the main stack can withstand a high potential difference across its end units; a porcelain casing extending circumferentially around the edges of the stack-sheets and extending normal to the plane of the sheets of the main stack from one end unit stack to the other end unit stack, whereby the stack-enclosure between end stack units of high potential difference consists of porcelain alone; the casing being formed with an exterior skirting device and the exterior porcelain surface of the casing being glazed between the two end units of the stack, thereby increasing the resistance of the discharge path between end stack units of highest potential difference; and metal end members secured rigidly to the porcelain casing at points adjacent the end units of the main stack and therefore reducing the discharge path around the outside of the casing between such units of highest potential difference.

22. In a high potential condenser, the combination with a condenser stack to be enclosed and compressed, of a porcelain stack-casing having an open end; a cover plate enclosing said open end; and a metal end-structure located between the said cover plate and the adjacent end of the stack and transmitting, independently of said cover plate, clamping strains between the end of the stack and the end of the casing.

23. The combination with an electrical condenser stack, of a porcelain casing therefor having an end opening; a metal cover closing said opening; a stack-clamping member inside the casing; and a metal member to which said cover is secured, said metal member engaging the casing adjacent its opening and constituting an element of a means by which stack-clamping strains are transmitted to the casing as a tension member.

24. In a high potential condenser, the combination with a condenser stack to be enclosed and compressed, of an insulating casing therefor of sufficient length to provide a tolerance space betwen an end of the stack and the corresponding end of the casing; and a clamping screw exerting compression strains on said end of the stack and extending through said tolerance space; and a pressure plate receiving the other end of said screw and transmitting the clamping strains to the insulating casing as the tension member of the stack-clamping system.

25. In a high potential condenser, the combination with a condenser stack to be enclosed and compressed, of an insulating casing therefor of sufficient length to provide a tolerance space betwen an end of the stack and the corresponding end of the casing; a bearing plate in said tolerance space and adjacent a stack-end; a clamping screw acting against said bearing plate and exerting compression strains on said stack-end; and a pressure plate receiving the other end of said screw and transmitting the clamping strains to the insulating casing as the tension member of the stack-clamping system.

26. In a high potential condenser, the combination with a stack of condenser sheets to be enclosed and compressed together, of a thick-walled porcelain casing for the stack; a pressure plate; and a stack-clamping member located inside said casing and acting between an end of the stack and said pressure plate; said pressure plate being located between said stack-clamping member and a portion of the casing-wall and transmitting clamping strains from the stack-clamping member to the casing, the latter constituting a tension member of the stack-clamping system.

27. In a high potential condenser, the combination with a condenser stack to be enclosed and compressed, and comprising a plurality of serially-connected sections; of a porcelain casing therefor, a clamping screw located inside said casing and exerting clamping compression on one end of the stack; and a metal end structure engaging said clamping screw and closing and secured to the end of the casing.

28. The combination with an electrical condenser stack to be enclosed and compressed, of a porcelain casing surrounding the stack, a clamping terminal located inside the said casing at one end of the stack; and a device located inside the casing at the other end of the stack and forcing the stack against said clamping terminal and thereby against the casing.

29. The combination with an electrical condenser stack, and a porcelain casing surrounding said stack, of a clamping terminal located inside the casing and between an end of the stack and an end of the casing; another clamping terminal located at the other end of the stack and casing; and clamping means tending to force said terminals apart and putting the porcelain casing under tension.

30. The combination with an electrical condenser stack, of a porcelain casing surrounding it, and metal clamping members located inside the casing and compressing the stack between them therein and arranged to put the porcelain casing under clamping tension.

31. The combination with an electrical condenser stack, of a porcelain casing therefor having therefor having end openings; metal end structures at the ends of said casing; and compressing means for the stack arranged to force the metal end structures away from one another, putting the casing under tension; the wall of the porcelain casing being sufficiently thick at the portions engaged by the metal end structures, to withstand stack-clamping strains on the casing.

32. The combination with an electrical condenser stack, of a porcelain casing therefor having end openings; metal end structures secured to the ends of the casing; stack-clamping means forcing the metal end structures away from one another and putting the casing under tension; the wall of the casing being sufficiently thick at its portions which are engaged by the metal end structures to withstand stack-clamping strains on the casing; and a joint material intervening between said structures and the portions of the casing engaged thereby, said joint material directly taking the strains of the clamping means.

33. The combination with an electrical condenser stack, of a porcelain casing therefor having end openings; metal end structures at the ends of the casing, a stack-clamp forcing the metal end structures away from one another and putting the casing under tension; and a joint material located between the casing and an end structure and receiving compression strains from the stack-clamp.

34. The combination with an electrical condenser stack, of a porcelain casing therefor having end openings; metal end structures at the ends of said casing; a stack-clamp forcing the metal end structures away from one another and putting the casing under tension; and a joint material located between the casing and an end structure and receiving compression strains from the stack-clamp.

35. The combination with an electrical condenser stack, of a porcelain casing therefor having end openings; metal end structures at the ends of said casing; a stack-clamp forcing the metal end structures away from one another and putting the casing under tension; and a joint material located between the casing and an end structure and receiving compression strains from the stack-clamp.

36. The combination with an electrical condenser stack, of a porcelain casing therefor having open ends; a metal clamping terminal closing one end of the casing and receiving a compressing thrust from an end of the stack; a metal structure at the other end of the casing and transmitting stack compression strains to the casing as a tension member; and a metal cover closing said other end of the casing.

37. The combination with an electrical condenser stack, of a porcelain casing therefor having opposite end openings; a metal clamping terminal closing one end of the casing; a metal cover closing the other end of the casing; and a metal member secured to said cover and transmitting stack compression strains to the casing as a tension member.

38. The combination with an electrical condenser stack, of a porcelain casing therefor; a metal clamping terminal closing one end of the casing; a pressure plate at the other end of the stack and casing and transmitting stack compression strains to the casing as a tension member; and a device between said pressure plate and the end of the stack adjacent thereto and tending to force the stack and pressure plate away from one another.

39. The combination with an electrical condenser stack, of a porcelain casing therefor; a metal plate inside said casing and engaging the inner wall thereof; and a clamping device inside the casing and between the stack and said plate and forcing them apart, thereby transmitting stack-clamping strains by way of said plate to the casing as a tension member.

40. The combination with an electrical condenser stack, of an insulating casing therefor; a metal member inside the casing at one end thereof and receiving compression strains from the adjacent end of the stack and thereby forced against an interior wall of the casing; and a metallic structure at the other end of the stack and casing, insulated by said casing from said metal member and exerting compression strains on the stack and exerting tension strains on the insulating material of the casing.

41. In a high potential condenser, the combination with a condenser stack to be enclosed and compressed, of a thick-walled porcelain stack-casing; a metal stack-compressing member exerting clamping compression against an end of the stack; and a metal strain-transmitting member mechanically connected to said compressing member and forced thereby away from said stack-end into compressing engagement with said casing, putting the latter under tension strain; and protecting means between said porcelain casing and said metal strain-transmitting member at the place of their mutual compressing engagement.

42. The combination with an electrical condenser stack, of an insulating casing therefor; a metal member inside the casing at one end thereof and receiving compression strains from the adjacent end of the stack and thereby forced against an interior wall of the casing; and a metallic structure also inside the casing and at the opposite end of the casing and stack, insulated by said casing from said metal member and exerting compression strains on the stack and, cooperatively with said metal member, exerting tension strains on the insulating material of the casing.

JOHN A. PROCTOR.
WILLIAM M. BAILEY.